(12) United States Patent
Singh et al.

(10) Patent No.: US 8,473,330 B2
(45) Date of Patent: Jun. 25, 2013

(54) SOFTWARE-CENTRIC METHODOLOGY FOR VERIFICATION AND VALIDATION OF FAULT MODELS

(75) Inventors: Satnam Singh, Bangalore (IN); Steven W. Holland, St Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 610 days.

(21) Appl. No.: 12/635,391

(22) Filed: Dec. 10, 2009

(65) Prior Publication Data

US 2011/0145026 A1   Jun. 16, 2011

(51) Int. Cl.
*G06Q 10/00* (2012.01)

(52) U.S. Cl.
USPC ........ 705/7.37; 705/7.13; 705/7.31; 705/7.36

(58) Field of Classification Search
USPC ....... 705/4, 7.11–7.42; 701/1–124; 714/1–57; 301/2–137
See application file for complete search history.

(56) References Cited

U.S. PATENT DOCUMENTS

| | | | | |
|---|---|---|---|---|
| 6,633,782 | B1 * | 10/2003 | Schleiss et al. | 700/26 |
| 6,917,839 | B2 * | 7/2005 | Bickford | 700/30 |
| 2002/0183971 | A1 * | 12/2002 | Wegerich et al. | 702/185 |
| 2008/0125933 | A1 * | 5/2008 | Williams et al. | 701/30 |

FOREIGN PATENT DOCUMENTS

GB   2 303 231 A   2/1997

OTHER PUBLICATIONS

Abu-Hakima, Suhayya, "Multiple Views of Knowledge in Diagnosis" NRC-CNRC, NRC Publications Archive (NPArC), Web page for NRC (Canada).

\* cited by examiner

*Primary Examiner* — David Rines
(74) *Attorney, Agent, or Firm* — John A. Miller; Miller IP Group, PLC

(57) ABSTRACT

A method for verifying and improving a vehicle fault model is disclosed. The method includes analyzing the available field failure data that includes vehicle symptoms and failures for many vehicles. The method performs an analysis using the field failure data that includes using subject matter expert knowledge to determine the most significant failure modes and the most significant symptoms. The method also includes learning simulation parameters from the field failure data and simulating faults using the learned simulation parameters. The method further includes verifying and validating the fault model based on the most significant failure modes and the most significant symptoms from the what-if analysis and the faults identifies by the simulation, and using a diagnostic reasoner to analyze the revised fault model to generate estimated faults. The method then compares the estimated faults to the simulated faults to determine true detection and false alarm rates for a benefit analysis.

19 Claims, 3 Drawing Sheets

SOFTWARE-CENTRIC METHODOLOGY FOR VERIFICATION AND VALIDATION OF FAULT MODELS

BACKGROUND OF THE INVENTION

1. Field of the Invention

This invention relates to a method for verifying, validating and improving vehicle fault models that includes performing a what-if analysis using experts to identify significant failure modes and symptoms using field failure data, learning simulation parameters from the field failure data, simulating faults using the learned parameters, generating simulations using the what-if analysis and the fault model along with diagnostic reasoner to provide estimated faults and comparing the estimated faults to the simulated faults for benefit analysis.

2. Discussion of the Related Art

Modern vehicles are complex electrical and mechanical systems that employ many components, devices, modules, sub-systems, etc. that pass electrical information between and among each other using sophisticated algorithms and data buses. As with anything, these types of devices and algorithms are susceptible to errors, failures and faults that affect the operation of the vehicle. When such errors and faults occur, often the affected device or component will issue a fault code, such as diagnostic trouble code (DTC), that is received by one or more system controller identifying the fault, or some ancillary fault with an integrated component. These DTCs can be analyzed by service technicians and engineers to identify problems and/or make system corrections and upgrades. However, given the complexity of vehicle systems, many DTCs and other signals could be issued for many different reasons, which could make trouble-shooting particular difficult.

Vehicle fault models that define the faults that could occur in a vehicle and the remedies available for those faults are becoming more prevalent in the industry. One of the most simplistic representations of a fault model is a two-dimensional matrix where the rows of the matrix capture the failure modes that could occur on the vehicle and the columns of the matrix identify the symptoms that the vehicle may experience for the failure modes. The fault model captures the causal dependencies among the failure modes and symptoms. The various symptoms could be information that is recorded during operation of the vehicle, or information that is occurring while the vehicle is being serviced. Thus, by placing an indicator at the cross section between a particular failure mode and the symptoms that the vehicle would undergo for those failure modes in the fault model, service personnel can identify what service operation needs to be performed based on the symptoms that are occurring to correct a particular failure.

Depending on the scope of the fault model, the matrix may be very large, and may be updated and refined so that it is eventually able to identify specific repair operations for each possible symptom. Further, various fault models can be provided for different levels of the vehicle, where such fault models can be provided for specific vehicle subsystems, fault models can be provided for specific vehicle brands, makes, model, etc.

It is desirable to accurately populate fault models so that they do not employ redundant information, they accurately identify the failures and they accurately identify the symptoms related to those failures. In other words, it is desirable to have a methodology to verify and validate integrated vehicle health management (IVHM) fault models by a systematic methodology linked to field failure data collected from many vehicles.

SUMMARY OF THE INVENTION

In accordance with the teachings of the present invention, a method for verifying, validating and improving a vehicle fault model is disclosed. The method includes providing an initial fault model that identifies causal dependencies between symptoms occurring in a vehicle and failure modes in the vehicle for those symptoms, and providing field failure data that includes vehicle symptoms and failures for many vehicles. The method performs a what-if analysis using the field failure data that includes using subject matter expert (SME) knowledge to determine the most significant failure modes and the most significant symptoms. The method also includes learning simulation parameters from the field failure data and simulating faults using the learned simulation parameters. The method further includes validating the fault model based on the most significant failure modes and the most significant symptoms from the what-if analysis and the faults identified by the simulation. Further, the method employs a diagnostic reasoner to generate estimated faults using the fault model and the symptoms present in the what-if scenarios and simulations. The method then compares the estimated faults to the simulated faults to determine true detection and fault alarm rates, and then performs a benefit analysis by relating the true detection and false alarm rates to the repair costs, such as labor costs, other labor hour costs, total costs, etc.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for verifying, validating and improving a fault model is merely exemplary in nature, and is in no way intended to limit the invention or its applications or uses. For example, the present invention has particular application for vehicle fault models. However, the method of the invention will have other applications for other industries, such as fault model validation in the aerospace industry.

Figure 1:
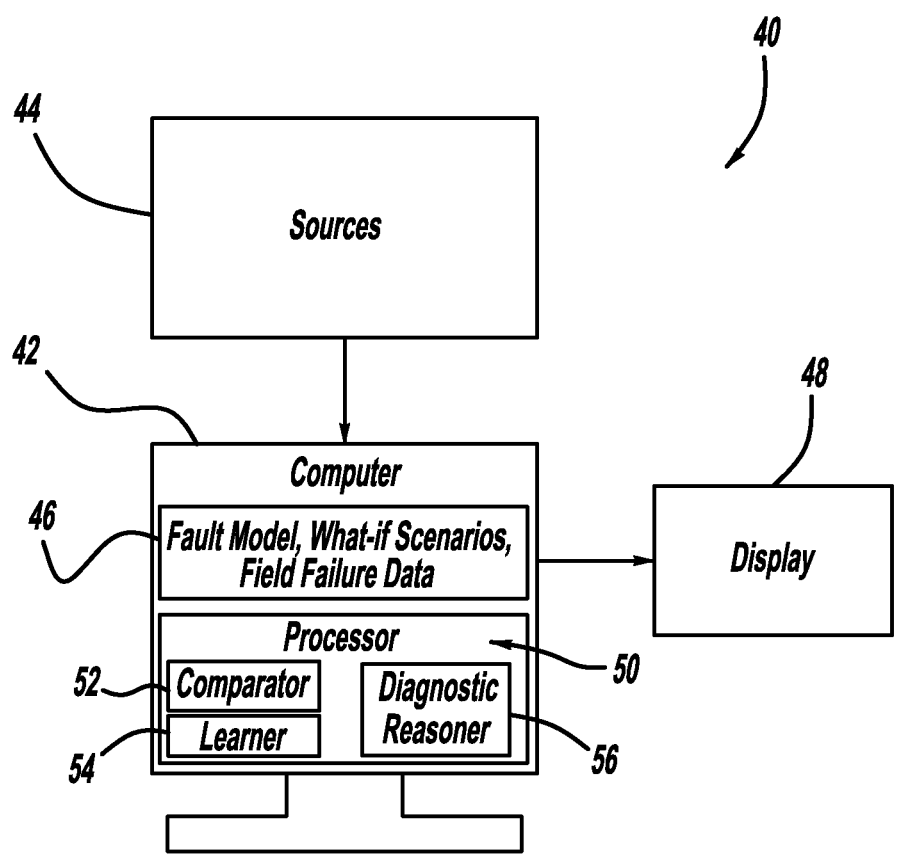
FIG. 1 is a block diagram of a system for verifying, validating and improving a vehicle fault model.

FIG. 1 is a block diagram of a system 40 that provides the necessary hardware for a proposed method for verifying, validating and improving a vehicle fault model for a particular vehicle and/or vehicle system, where the proposed process for verifying, validating and improving a fault model is performed off-board. The system 40 includes a computer 42 that is intended to represent any suitable processor that processes information received from various sources 44 that provide field failure data. The sources 44 can be any source suitable for the purposes described herein, such as warranty reports, service shop data, telemetric data, etc. The information and data received by the computer 42 is stored in a memory 46 on the computer 42, which can be accessed by SMEs. The computer 42 is capable of running simulations and learning simulation parameters from the field failure data consistent with the discussion herein. The memory 46 stores the fault models, what-if scenarios, Monte-Carlo simulations and field failure data consistent with the discussion herein. The computer 42 also includes a processor 50 that includes a comparator 52, a parameter learner 34 and a diagnostic reasoner 56 for purposes that will become readily apparent based on the discussion below. The computer 42 provides a tool that allows the SME to analyze the data and information in a suitable format, such as reports and fault models, which can be displayed on a display device 48.

Figure 2:
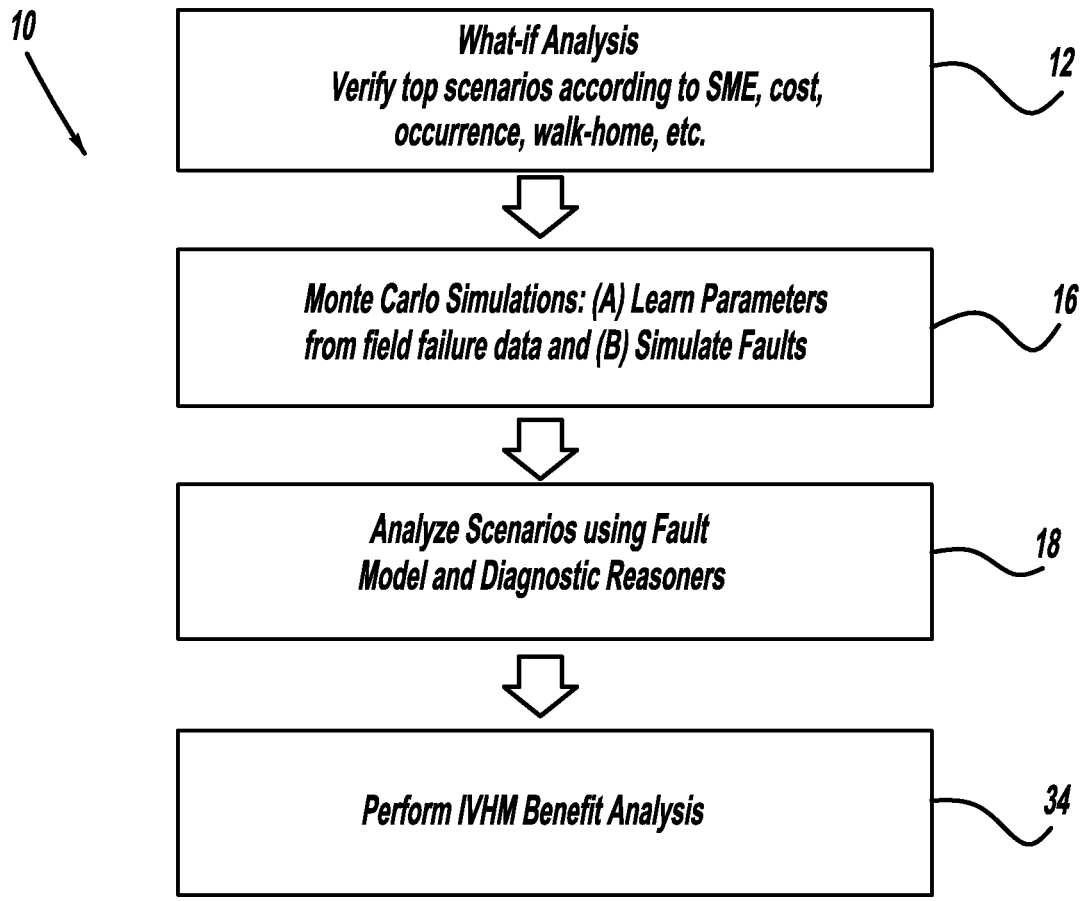
FIG. 2 is a flow-chart diagram showing a process for verifying, validating and improving a vehicle fault model.

FIG. 2 is a flow-chart diagram 10 showing a proposed process for verifying, validating and improving a fault model. At the beginning of the process, a fault model has been generated for a particular vehicle or system, and that fault model will be analyzed to be validated and improved. In order to do this, historical data is used for various symptoms and their repairs from information that is collected in the field and otherwise. Thus, the various field failure data that is collected over time for many vehicles is used to assess the current fault model, and provide changes thereto that are more appropriate. For example, by looking at various identified problems or systems, and studying what solutions were performed on that system, it can be determined what solution had the most effect and was the more reliable for preventing that symptom from occurring again.

Figure 3:
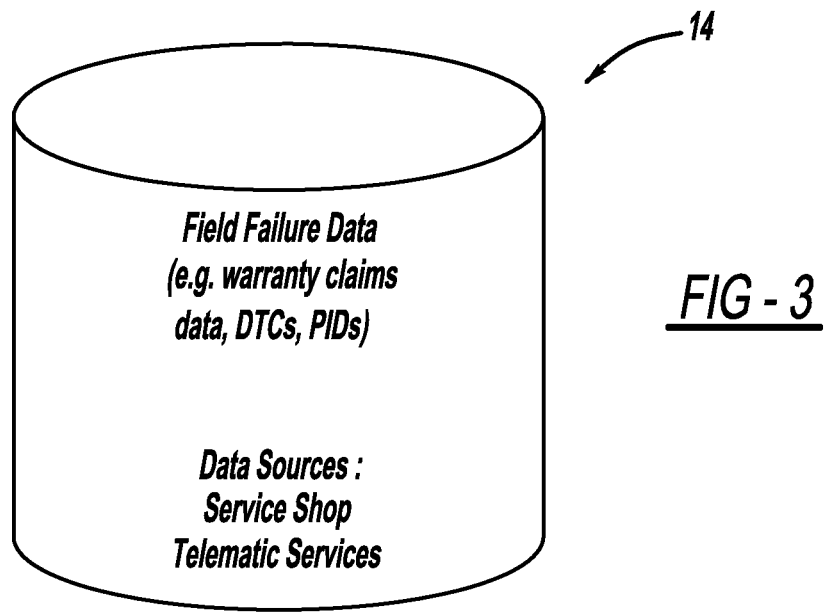
FIG. 3 is an illustration of field failure data collected from many vehicles for the process shown in FIG. 1.

A first step of the process at box 12 is referred to as a "what-if analysis" that uses SME knowledge and data from various databases, programs, reports, etc. to identify the most significant failure modes in response to SME, cost, frequency of occurrence, operator walk-home, etc., and determine the most significant symptoms, i.e., symptoms that occurred during these failure modes considering the occurrence and severity of those symptoms. This analysis can determine any number of the top failure modes, such as fifty, and any number of the top symptoms, where the what-if analysis employs a deterministic and software approach to generate the scenarios. In this embodiment, the information and data can come from field failure data 14, as shown in FIG. 3, that includes warranty claims data, DTCs, operating parameter identifier (PIDs) data from many different sources, such as service shops, telematics services, etc. The PIDs identify any suitable vehicle parameter, such as voltages, pressures, temperatures, currents, etc. The data can include what actions were taken for certain symptoms and the DTCs for warranty claims and other service occurrences, and whether those systems were effective.

Once the field failure data 14, and other information, has been evaluated at the box 12 as discussed above, then fault simulations can be performed at box 16. The operations that are performed at the box 16 include two steps, namely, learning parameters from the field failure data 14 and simulating faults. Particularly, the field failure data 14 can be used in a probabilistic and software approach to learn parameters for simulation, i.e., for example, the field failure data 14 can be used to learn bivariate failure distribution of major faults, the distribution of major repairs with respect to both mileage and time of service, the average labor cost, other labor hour costs, part cost, total cost of component repair, etc.; repeat visits for the same system and multi-claim rates; conditional probabilities among the failure modes, such as labor codes, and symptoms, such as DTCs; fault appearances and disappearance probabilities for simulating intermittent faults; and learning occurrence count and severity of each symptom.

The learned parameters are then used to simulate faults in the second step. In one non-limiting embodiment, the faults are simulated using a Monte Carlo simulation, well known to those skilled in the art. The simulation randomly inserts a large number of failures and symptoms according to a probability distribution that is learned from the field failure data 14. The simulation can simulate permanent faults that employ bivariate failure distributions to simulate faults with realistic scenarios and simulate intermittent faults that employ fault appearance and disappearance probability distributions to simulate the faults in a realistic manner during the actual incident and later in the service bay. Symptom outcomes are generated that employ fault models, conditional probabilities among failure modes and symptoms to get sets of passed symptom outcomes and failed symptom outcomes.

Once the simulations have been performed at the box 16, then appropriate personnel can analyze the what-if analyzer and the simulation scenarios using the fault model and a diagnostic reasoned at box 18. A diagnostic reasoner is an algorithm that looks at the various failure modes and symptoms, and is able to determine which failure modes are responsible for the symptoms present in the vehicle.

Figure 4:
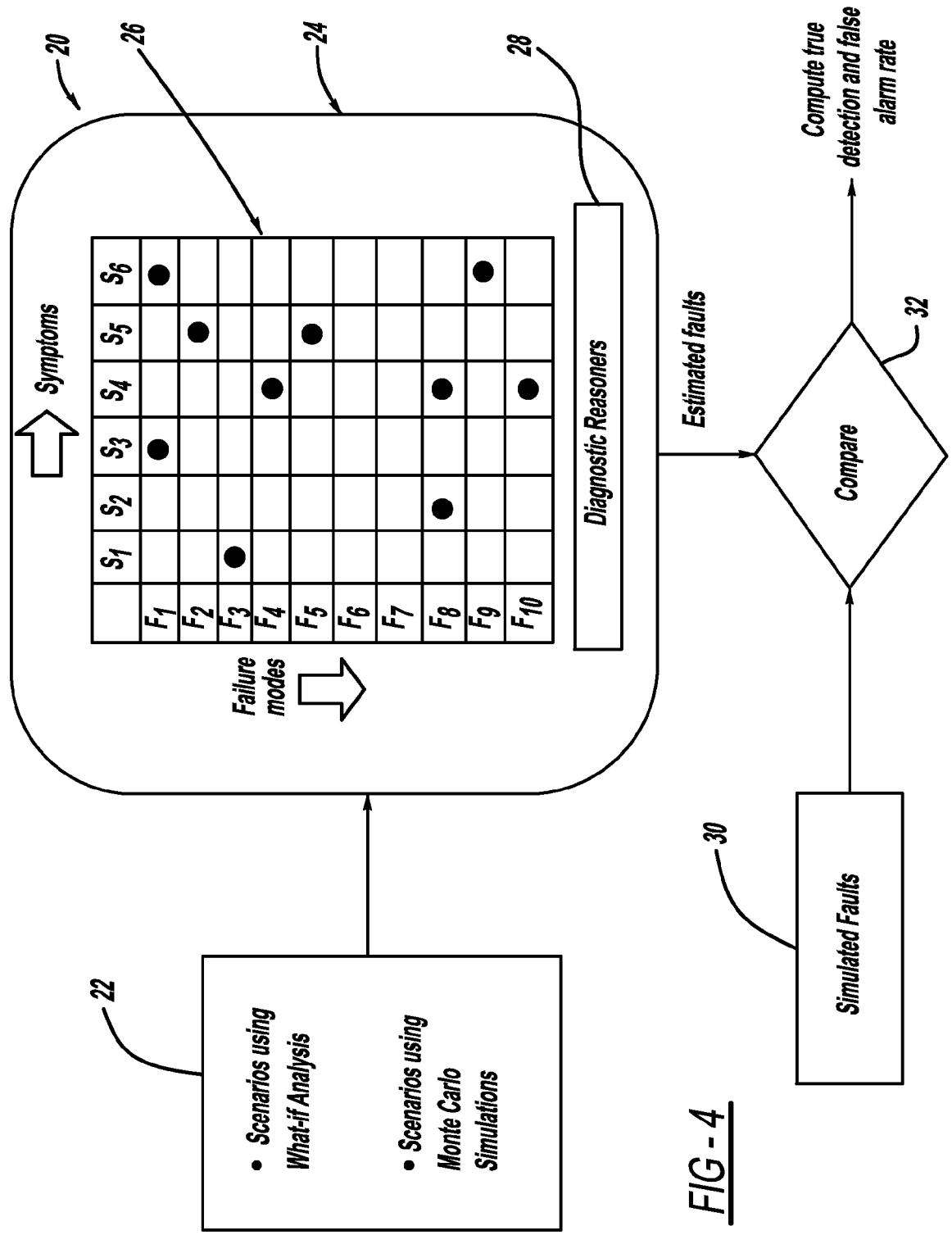
FIG. 4 is a flow diagram showing a process for analyzing scenarios using a fault model and diagnostic reasoner in the process shown in FIG. 1.

FIG. 4 is a flow diagram 20 including an analysis algorithm 24 that has a fault model 26 and a diagnostic reasoner 28. The fault model 26 is the fault model that is being developed by the process to be verified, validated and improved as more field failure data and other information becomes available over time so that eventually the fault model 26 will provide a comprehensive tool for identifying failure modes based on their symptoms. The fault model 26 shows symptoms along the top axis, represented as $S_1$-$S_6$, and failure modes on the vertical axis, represented as $F_1$-$F_{10}$. A black dot (Boolean or fractional value between 0 and 1) in a fault model corresponds to which failure mode could be identified by which failure symptom. The diagnostic reasoner 28 analyzes the symptoms present to provide a ranked order list of the estimated failure modes according to their likelihood values. The methodology being discussed herein can perform a quantitative comparison of diagnostic reasoners. Box 22 shows various scenarios using the what-if analysis at the box 12 and using the simulations at the box 16 that are used to generate the fault model 26 in the manner discussed above. Box 30 represents simulated faults that are provided by the simulations at the box 16. The simulated faults 30 are analyzed via the fault model 26 and the diagnostic reasoner 28 to generate estimated faults, which are compared by a comparator 32 with the simulated faults from the algorithm 30 to identify true detection and false alarm rates as the analysis at the box 18. Thus, by performing the what-if analysis and simulating the faults, the fault model 26 can be validated and modified so that symptoms can be better connected to failure modes.

This process provides a systematic and quantitative way to benchmark several diagnostic reasoners by generating simulations and analyzing them via the diagnostic reasoners. Since the same scenario is fed to each reasoner, the output of the diagnostic reasoner and comparator, i.e., true detection false alarm rate, could be compared and benchmarked.

Once the comparison is made between the estimated faults and the simulated faults by the comparator 32, then appropriate personnel can perform an IVHM benefit analysis at box 34 to reduce costs.

The IVHM benefit analysis relates the detection rate and false alarm rate of the diagnostic reasoners 28 to the repair costs, such as labor costs, other labor hour costs, total costs, etc. Further, the IVHM benefit analysis computes the decrease in misdiagnosis rates, repeat visits and multi-claim rates using the results of the diagnostic reasoning. The analysis also computes savings due to IVHM fault models and diagnostic reasoning.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for verifying, validating and improving a fault model, said method comprising:
   providing an initial fault model that identifies correlations between symptoms in a vehicle and failure modes in the vehicle;
   providing field failure data that includes vehicle symptoms and vehicle failure modes of many vehicles that are in the field being operated;
   performing a what-if analysis using the field failure data that includes using subject matter expert (SME) knowledge to determine a subset of the most significant failure modes and the most significant symptoms, where the most significant failure modes are determined according to frequency of occurrence, cost, and customer walk-home occurrences;
   learning simulation parameters from the field failure data;
   simulating faults, by a processor running simulation software, using the learned simulation parameters where simulated faults include a relationship between and one or more failure modes and one or more symptoms;
   revising the initial fault model using the subset of the most significant failure modes determined by the what-if analysis and the simulated faults;
   analyzing, by a diagnostic reasoner, the simulated faults using the revised fault model to generate estimated failure modes;
   correlating the estimated failure modes to the simulated faults to determine true detection and false alarm rates; and
   performing a benefit analysis by relating the true detection and false alarm rates to costs.

2. The method according to claim 1 wherein the field failure data includes warranty claims data, diagnostic trouble codes and parameter identifiers.

3. The method according to claim 1 wherein performing the what-if analysis includes determining a predetermined number of the most significant symptoms according to frequency of occurrence and severity.

4. The method according to claim 1 wherein learning simulation parameters from the field failure data includes identifying a bivariate failure distribution of major faults, determining the average labor cost, other labor hour cost, part cost and total cost of components repairs, determining repeat visits and multi-claim rates, determining conditional probabilities among failure modes and symptoms, determining fault appearance and disappearance probabilities for simulating intermittent faults, and learning occurrence count and severity of symptoms.

5. The method according to claim 1 wherein simulating faults includes performing a Monte Carlo simulation.

6. The method according to claim 1 wherein simulating faults using the learned parameters includes simulating permanent faults and simulating intermittent faults.

7. The method according to claim 6 wherein simulating permanent faults includes employing bivariate failure distribution to simulate faults with realistic scenarios and simulating intermittent faults includes employing fault appearance and disappearance probability distributions to simulate the intermittent faults in a realistic manner during an actual incidence and in a service bay.

8. The method according to claim 1 wherein performing the benefit analysis includes computing a decrease in misdiagnosis rate, repeat visit and multi-claim rate using diagnostic reasoning results.

9. The method according to claim 1 further comprising using a plurality of diagnostic reasoners and benchmarking the diagnostic reasoners by generating simulations and analyze them through the diagnostic reasoners.

10. A method for verifying, validating and improving a fault model, said method comprising:
    providing an initial fault model that identifies correlations between symptoms in a vehicle and failure modes in the vehicle;
    providing field failure data that includes vehicle symptoms and vehicle failures of many vehicles that are in the field being operated, where the field failure data includes warranty claims data, diagnostic trouble codes and operating parameter identifiers;
    performing a what-if analysis using the field failure data that includes using subject matter expert knowledge to determine a subset of the most significant failure modes and the most significant symptoms, where the most significant failure modes are determined according to frequency of occurrence, cost and customer walk-home occurrences and determining the most significant symptoms according to frequency of occurrence and severity;
    learning simulation parameters from the field failure data;
    simulating faults, by a processor running simulation software, using the learned simulation parameters, where simulating faults includes simulating permanent faults and intermittent faults;
    revising the initial fault model using the subset of the most significant failure modes determined by the what-if analysis and the simulated permanent and intermittent faults;
    analyzing, by a diagnostic reasoner, the simulated faults using the revised fault model to provide a ranked order list of estimated failure modes according to likelihood values;
    correlating the estimated failure modes to the simulated faults to determine true detection and false alarm rates; and
    performing a benefit analysis using the true detection and false alarm rate that includes computing savings due to the revised fault model and diagnostic reasoning.

11. The method according to claim 10 wherein learning simulation parameters from the field failure data includes identifying a bivariate failure distribution of major faults, determining the average labor cost, other labor hour cost, part cost and total cost of components repairs, determining repeat visits and multi-claim rates, determining conditional probabilities among failure modes and symptoms, determining fault appearance and disappearance probabilities for simulating intermittent faults, and learning occurrence count and severity of symptoms.

12. The method according to claim 10 wherein simulating faults includes performing a Monte Carlo simulation.

13. The method according to claim 10 wherein simulating permanent faults includes employing bivariate failure distribution to simulate faults with realistic scenarios and simulating intermittent faults includes employing fault appearance and disappearance probability distributions to simulate the intermittent faults.

14. The method according to claim 10 wherein performing the benefit analysis includes computing a decrease in misdiagnosis rate, repeat visit and multi-claim rate using diagnostic reasoning results.

15. A method for verifying and validating a fault model, said method comprising:
    selecting an initial fault model that identifies correlations between failure modes and symptoms in a system;
    providing field failure data from a plurality of systems being operated in the field, where field failure data includes symptoms and failure modes in said plurality of systems;
    performing a what-if analysis using the field failure data that includes using subject matter expertise (SME) knowledge to determine a subset of the most significant failure modes and the most significant symptoms, where the subset of the most significant failure modes and most significant symptoms are determined based on frequency of occurrence and cost;
    learning, by a simulation system including a processor executing simulation software, simulation parameters from the field failure data, where learning simulation parameters includes identifying conditional probabilities among failure modes and symptoms;
    simulating faults, by said simulation system, using the learned simulation parameters, where simulated faults includes an identified relationship between one or more failure modes and one or more symptoms;
    revising the initial fault model using the subset of the most significant failure modes and the most significant symptoms determined by the what-if analysis and the simulated faults; and
    analyzing, by a diagnostic reasoner, the simulated faults using the revised fault model to provide a ranked order list of estimated failure modes accordingly to likelihood values; and correlating the estimated failure modes to the simulated faults to determine true detection and false alarm rates.

16. The method according to claim 15 wherein performing the what-if analysis includes determining a predetermined number of the most significant failure modes according to frequency of occurrence, cost and customer walk-home occurrences.

17. The method according to claim 15 wherein performing the what-if analysis includes determining a predetermined number of the most significant symptoms according to frequency of occurrence and severity.

18. The method according to claim 15 wherein simulating faults using the learned parameters includes simulating permanent faults and simulating intermittent faults.

19. A method for verifying, validating and improving a fault model, said method comprising:
    providing an initial fault model that identifies correlations between symptoms in a vehicle and failure modes in the vehicle;
    providing field failure data that includes vehicle symptoms and vehicle failure modes of many vehicles that are in the field being operated;
    performing a what-if analysis using the field failure data that includes using subject matter expert (SME) knowledge to determine a subset of the most significant failure modes and the most significant symptoms;
    learning, by a simulation system including a processor executing simulation software, simulation parameters from the field failure data, where learning simulation parameters includes identifying a bivariate distribution of major faults, determining the average labor cost, determining a part cost and total cost of components repairs, determining repeat visits and multi-claim rates, determining conditional probabilities among failure modes and symptoms, determining fault appearance and disappearance probabilities for simulating intermittent faults, and learning occurrence count and severity of symptoms;
    simulating faults, by the simulation system, using the learned simulation parameters, where simulated faults include a relationship between one or more failure modes and one or more symptoms;
    revising the initial fault model using the subset of the most significant failure modes and the most significant symptoms determined by the what-if analysis and the simulated faults;
    analyzing, by a diagnostic reasoner, the simulated faults using the revised fault model to generate estimated failure modes;
    correlating the estimated failure modes to the simulated faults to determine true detection and false alarm rates; and
    performing a benefit analysis by relating the true detection and false alarm rates to costs.

* * * * *